No. 843,198. PATENTED FEB. 5, 1907.
W. W. DOOLITTLE.
MACHINE FOR ATTACHING FLANGES.
APPLICATION FILED OCT. 30, 1903.

Witnesses:
Paul Carpenter
F. W. H. Clay

Inventor:
William W. Doolittle
By Paul Synnestvedt
Att'y

No. 843,198.

PATENTED FEB. 5, 1907.

W. W. DOOLITTLE.
MACHINE FOR ATTACHING FLANGES.
APPLICATION FILED OCT. 30, 1903.

Witnesses:
Paul Carpenter
F. W. H. Clay

Inventor:
William W. Doolittle
By Paul Synnestvedt
Att'ys

No. 843,198. PATENTED FEB. 5, 1907.
W. W. DOOLITTLE.
MACHINE FOR ATTACHING FLANGES.
APPLICATION FILED OCT. 30, 1903.

Witnesses:
Paul Carpenter
F.W.H. Clay

Inventor:
William W. Doolittle
By Paul Synnestvedt
Att'ys

No. 843,198. PATENTED FEB. 5, 1907.
W. W. DOOLITTLE.
MACHINE FOR ATTACHING FLANGES.
APPLICATION FILED OCT. 30, 1903.
5 SHEETS—SHEET 5.
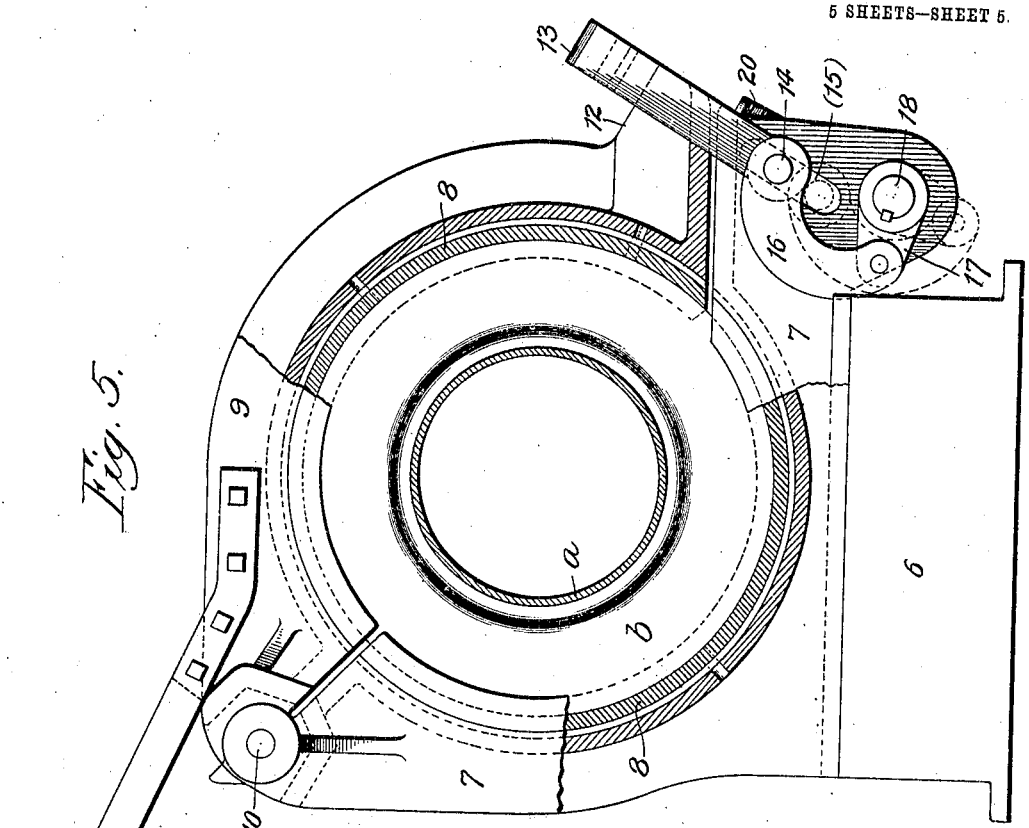
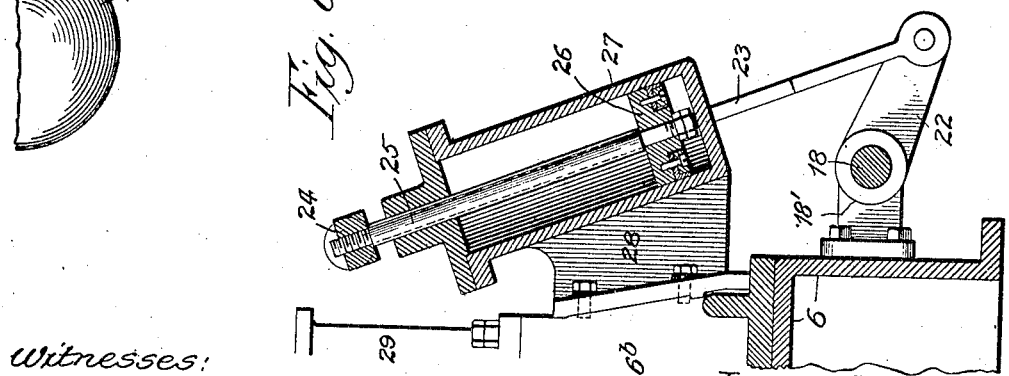
Witnesses:
Paul Carpenter
Inventor:
William W. Doolittle
By Paul Synnestvedt
Att'y

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

MACHINE FOR ATTACHING FLANGES.

No. 843,198.   Specification of Letters Patent.   Patented Feb. 5, 1907.

Application filed October 30, 1903. Serial No. 179,248.

*To all whom it may concern:*

Be it known that I, WILLIAM W. DOOLITTLE, a citizen of the United States, residing at Chicago, in the State of Illinois, have invented certain new and useful Improvements in Machines for Attaching Flanges, of which the following is a specification.

My invention relates particularly to machines designed for welding flanges upon tubes, and to such machines as exert the desired pressure between the parts by means of a traveling roller. The objects of the invention are to provide for yielding pressure upon the roll which compresses the parts together; to provide an easily adjustable pneumatic pressure roll for welding flanges; to provide a superior holding jaw for the pipe and flange and means for operating the same, and to generally improve the structure and operation of flange attaching machines. These objects, together with other advantages which will hereinafter appear, I attain by means of the construction illustrated in preferred form in the accompanying drawings, wherein—

Figure 5 is an end elevation of the holding jaw and section of a pipe in place therein, and Figure 6 is a cross-sectional view of the means for actuating the holder jaw, taken on line (6) in Figure 3.

Figure 1:
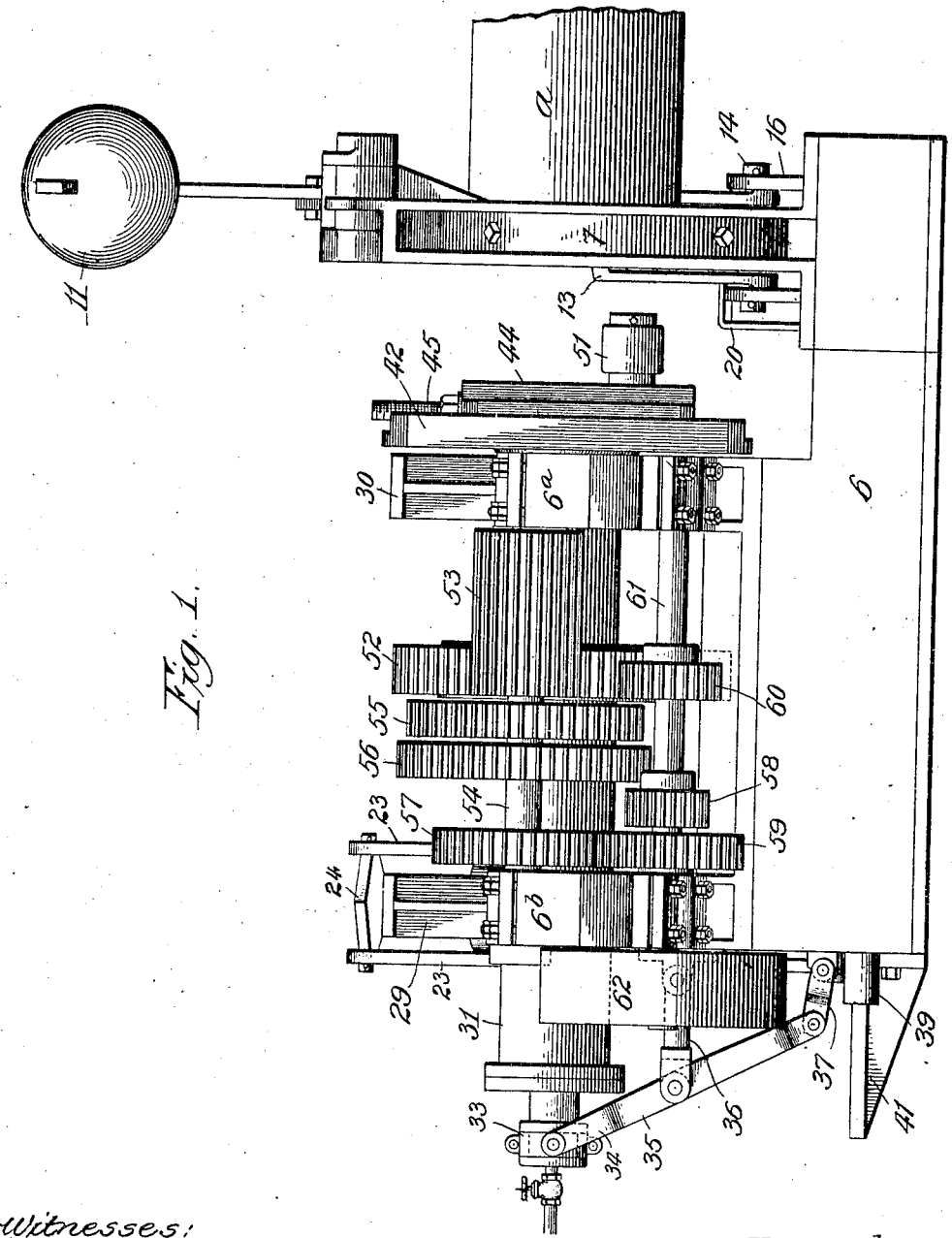
Figure 1 is a side elevation of the complete machine.
Figure 2:
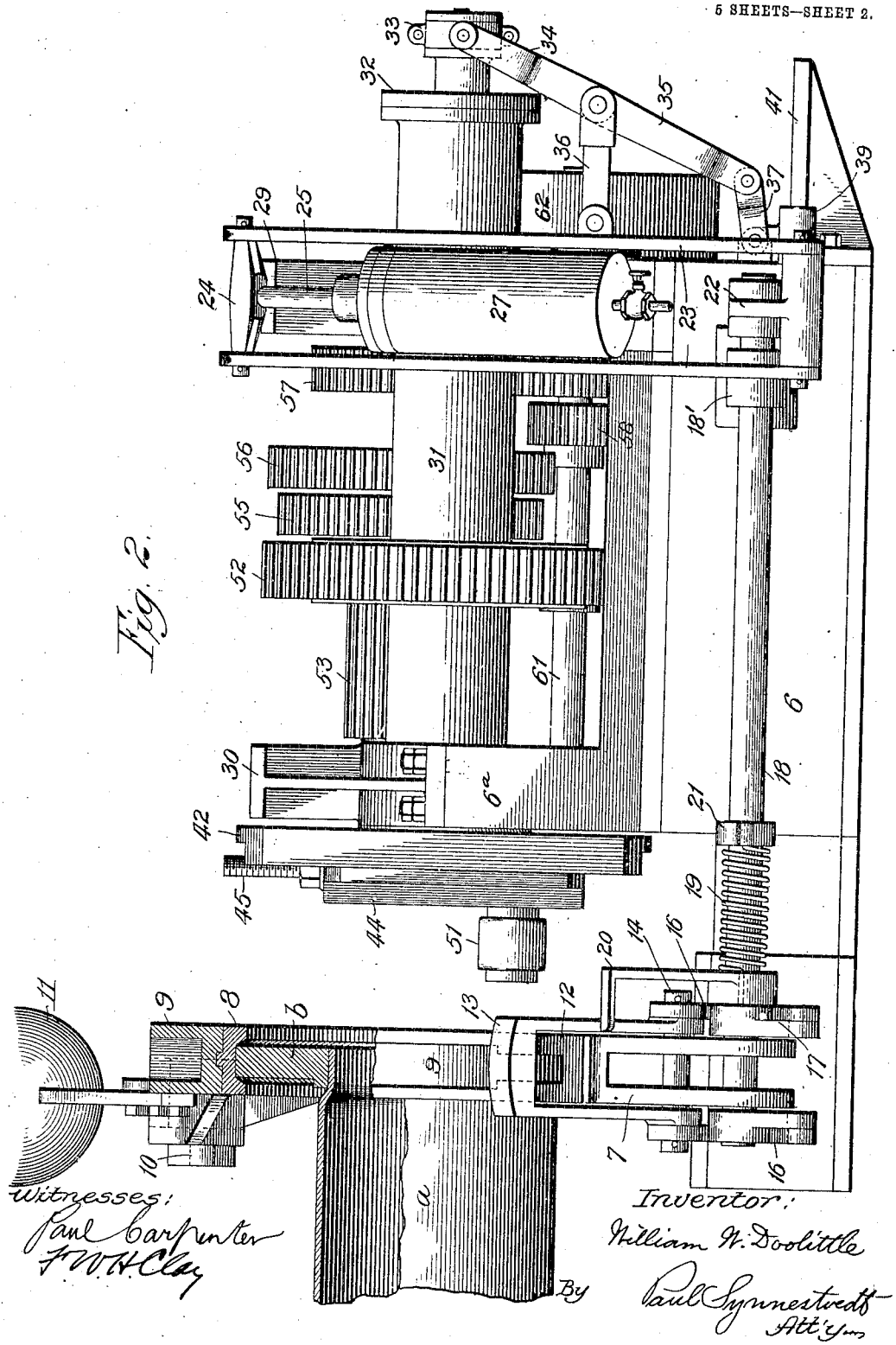
Figure 2 is an enlarged side elevation taken from the opposite side to that of Figure 1 and showing portions of the holding jaw in section.
Figure 3:
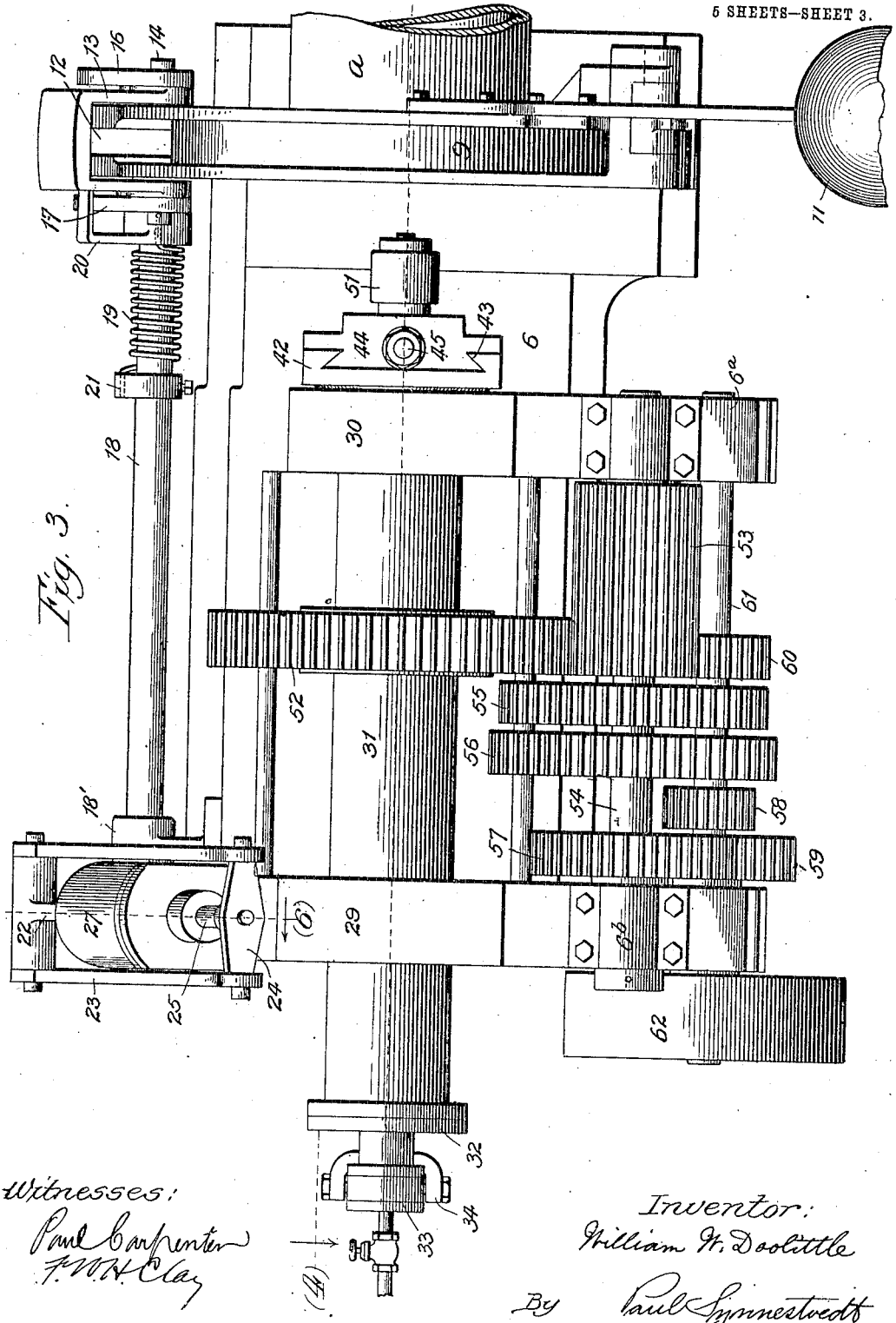
Figure 3 is a plan view of the entire machine.
Figure 4:
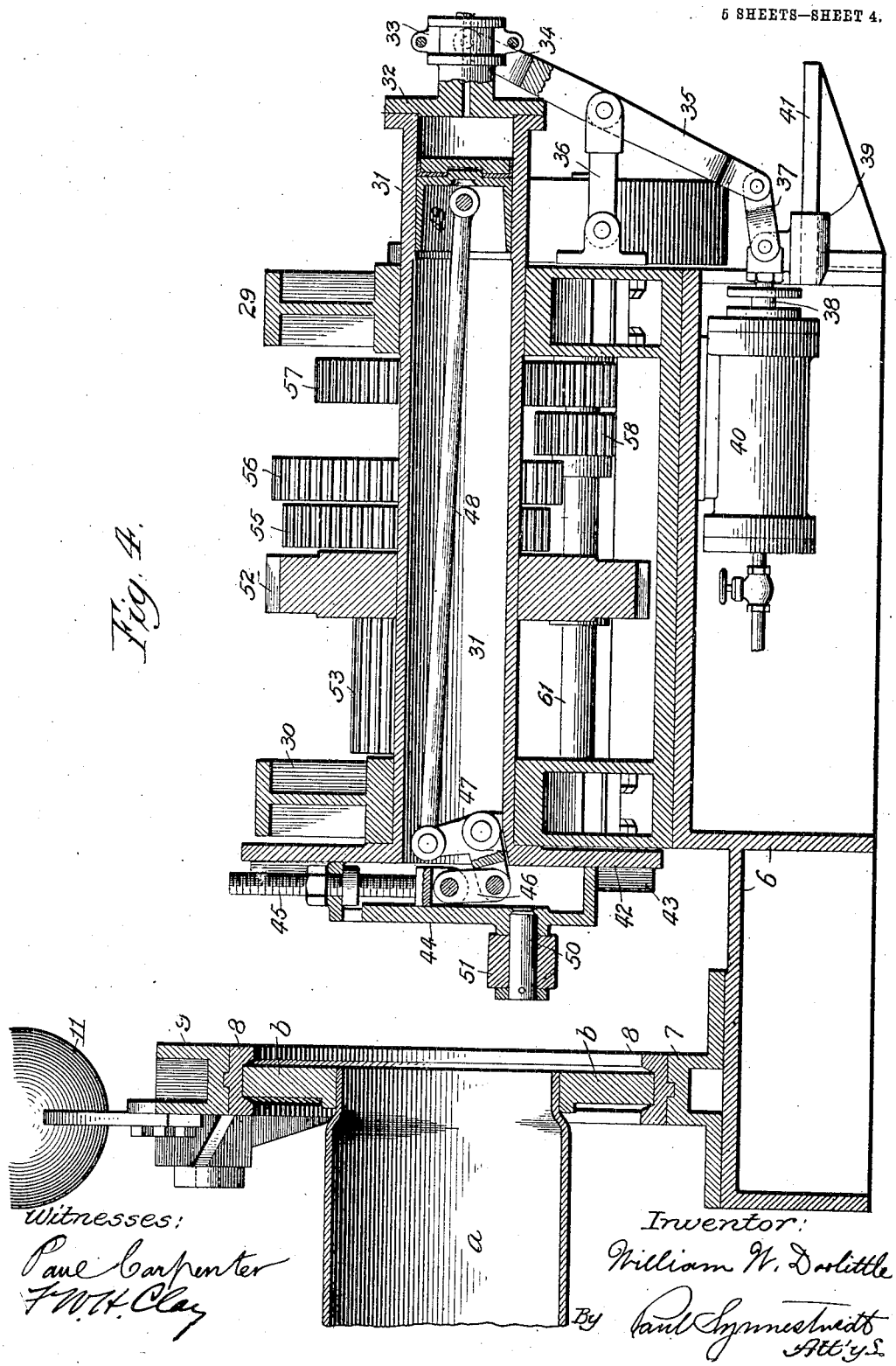
Figure 4 is a central longitudinal section through the pipe and flange holding jaw, and through the revolving presser head and its mountings, taken on line 4 in Figure 3.

While the machine is capable of other uses, it is primarily designed to firmly hold a heated flange and pipe in position to be operated upon and roll the metal of the pipe progressively around the interior circumference of the flange to weld the pipe on the flange. The pressure is exerted by a single traveling roller which is constantly under a yielding pressure and therefore may give somewhat to accommodate the irregularities in the circumference of the flange or the pipe. Referring especially to Figures 2, 4 and 5, it will be seen that upon the base of the machine, 6, I provide a semi-circumferential frame 7, which has a groove therein and holds the flange ring 8, for engaging the flange b, to be welded upon the pipe a, as shown in Figure 4. At the top of the frame 7, pivoted upon a pin 10, I provide a movable jaw 9, which is similarly provided with the flange ring 8, and is provided with a counter weight 11, so that it may be lifted easily about its pivoting point 10. At the forward end of this movable jaw it is provided with a projecting nose 12, which is engaged by yoke 13, pivoted upon pin 14, which slides in a slot 15, and is moved to and from its seat on the nose 12 by means of the curved links 16, which are actuated by the cranks 17 on the shaft 18. This device allows of considerable play of the position of the top half of the holder jaw, and provides a firm locking of the same in place when the yoke 13 is fully drawn down. Behind the yoke 13 I provide a convenient presser-finger 20, which is actuated by coil spring 19, upon the shaft 18, and held by collar 21; this normally presses the yoke 13 upward into position when the shaft 18 is revolved, as hereinafter described.

The far end of the shaft 18 for actuating the yoke for holding the flange jaws may be journaled in an extension 18', from the frame 6 of the machine, and at its end it is provided with a crank 22, which engages two links 23, attached to the yoke 24, which is borne upon the top of the piston rod 25, and by means of the piston 26, in the cylinder 27, is reciprocated by means of pneumatic or steam pressure in any ordinary and convenient manner, as will be understood. The cylinder 27 may conveniently be attached rigidly to the framework of the machine by means of the bracket 28, as shown in Figure 6.

On the base of the machine, 6, (Figure 4), I provide two upright bearing heads 29 and 30, in which is mounted to revolve and reciprocate, the cylinder 31. The rear end of the cylinder, 32, is provided with a notched pin which engages and revolves in a collar 33, attached to the yoke 34, of the lever 35, which is pivoted to the link 36, one end of which is fixed to the frame. At its other end, link 35 is attached by link 37, to the piston rod 38, guided to reciprocate in horizontal direction by means of the cross-head 39, on the guideway 41, and actuated by means of a piston in the cylinder 40, which may employ liquid, steam, or pneumatic pressure in any approved manner. This apparatus just described is for the purpose of longitudinally moving the cylinder 31 to carry its presser head to and from position to engage the pressure roll with the interior of the pipe, or to press it into the flange $b$, as will be understood.

At the forward end of the revolving and reciprocating cylinder 31, it carries a head 42, having two undercut guides 43, within which is reciprocated the press head 44, which by means of the screw 45, is adjustably attached to the link 46, and by bell-crank lever 47, pivoted fixedly within the cylinder 31, is actuated by means of the rod 48, and plunger 49, in cylinder 31. There is convenient means provided for the introduction and exhaustion of steam or air pressure behind the cylinder 49, as will be clearly understood, and it will be seen that by the actuation of the link 48 the movable press head 44, carrying the presser roll 51, is forced outward to engage the interior of the pipe within the flange. Also, it will be observed that the diameter of the circle of travel of the roll 51 is readily regulated by means of the screw 45, and is locked into its position by means of the nuts indicated in Figure 4.

In order to revolve the cylinder 31 and the roller 51, for the purpose of rolling down the metal within the flange by means of the presser head 44, the said cylinder and the presser head are revolved as a whole within the bearings 29, 30; and for this purpose the cylinder near the center may be provided with a gear 52, which engages the elongated gear 53, so as to allow of the longitudinal shifting movement heretofore described. The gear 53 is mounted upon the shaft 54, which is also provided with gears, 55, 56, and 57, to engage with corresponding gears, 58, 59, and 60, upon the driving shaft 61, and this latter is driven by means of a pulley 62 and a belt. The arrangement of these gears is not material to the invention, but they are preferably arranged as shown so as to provide several speeds of revolution of the cylinder 31, and also to provide for the reversing of the direction of the same. By means of the long gear 53 the gearing is not disturbed by the longitudinal shifting of the cylinder.

From the above description it will be apparent that the simple operation of the device is as follows: The flange and pipe being placed within the divided ring 8 of the jaws 7 and 9, and being firmly clamped down to position by means of the yoke 13, actuated by cylinder 27, as heretofore described, the roll is adjusted approximately to its proper radius. Compressed air or steam is now let into the cylinder 40, when the lever 35 thrusts the cylinder 31 forward until the head 44 and roll 51 are in proper position to come opposite to the seating surface of the pipe within the flange $b$, when the steam being admitted behind the piston 49 in cylinder 31, the roller is thrust with a very powerful but elastic pressure against the inside of the pipe adjacent to the flange $b$; and the gears 53, etc. in the meanwhile revolve the cylinder 31 carrying the roll 51, which thus travels around, thrusting the metal of the pipe and flange together, the pressure being regulated by the amount of steam admitted into the cylinder 31. It will be clear that in case a different form of surface is desired to roll within the pipe, or in case it is required to roll the edge as well as the internal diameter of the pipe, the roll 51 will be changed accordingly; it being understood that the machine can exert also a longitudinal pressure when this is desired. By placing the valves controlling the three cylinders together, one operator can nicely adjust the entire apparatus and operate it with great accuracy. Other advantages of the device will readily occur to those familiar with the art.

Having thus described my invention and illustrated its use, what I claim as new, and desire to secure by Letters Patent, is the following:

1. In a flange attaching machine in combination with a flange holding jaw and means for operating the same, a presser head mounted for both longitudinal and circumferential motion and carrying adjustably on said head a yieldingly supported roll for compressing the pipe and flange, substantially as described.

2. In a pipe flange welding machine a single pressure roll, mounted independently on a yielding arm to travel circumferentially and exert a yielding pressure on the flange, and means to hold it yieldingly in operative position within the flange, substantially as described.

3. In a flange welding machine the combination with a holding jaw and pneumatic means for locking the flange in the holding jaw, of a pressure roll and mechanism for exerting yielding pressure upon the presser roll and for shifting the position of said roll, substantially as described.

4. In a flange welding machine a holder jaw therefor comprising two grooved rings, one of which is pressed in place upon the other by means of a yoke actuated by means, and held with yielding pressure thereon, substantially as described.

5. In a flange welding machine the combination of a holding jaw and pneumatic means for locking the holding jaw, a pressure roll and pneumatic means for longitudinally shifting the presser roll, and pneumatic means for exerting pressure upon said presser roll, substantially as described.

6. In a flange welding machine a holder jaw, a traveling presser roll co-operating therewith, means for revolving the presser roll, and independent pneumatic means for exerting pressure upon said roll and for shifting the position of the presser roll, substantially as described.

7. In a flange welding machine a holder jaw for the flange comprising a divided grooved ring, one portion of said ring being pivoted to the other and being held in place by means of a movable pivoted yoke, a link attached to the pivots of said yoke, a crank and shaft operating said link and driven by pneumatic pressure, substantially as described.

8. In a flange welding machine the combination of a reciprocating and revolving cylinder and means for revolving it, pneumatic means for reciprocating it, a presser roll and pneumatic means within the cylinder for exerting pressure upon the presser roll.

9. In a flange welding machine, in combination with means for holding a pipe and flange, a cylinder mounted to reciprocate and to rotate, a presser roll on the head of the cylinder, a piston in said cylinder and adjustable link mechanism to move the roll thereby, means to revolve the cylinder and a fluid pressure cylinder with connections to reciprocate the cylinder.

10. In a flange welding machine a revolving head having a radially movable roll thereon, an adjusing screw on the movable part of the head, a link and a pivoted bell crank lever and a cylinder and a piston, a rod attached to said lever to thrust the roll radially to the cylinder by fluid pressure in the cylinder.

11. In a flange welding machine, a holder jaw therefor comprising a divided ring having its inner periphery adapted to engage the pipe flange, and means for holding said ring portions yieldingly together.

12. In a flange welding machine, a holder jaw therefor, comprising a fixed jaw, a movable jaw pivoted thereto, the inner peripheries of said jaws being adapted to engage the pipe flange, and means for holding said jaws yieldingly in their closed position.

13. In a flange welding machine, a holder jaw therefor, comprising a fixed jaw, a movable counterbalanced jaw pivoted thereto, the inner peripheries of said jaws being adapted to engage the pipe flange, and means for holding said jaws yieldingly together.

In testimony whereof I have hereunto set my hand in the presence of the two subscribed witnesses.

WILLIAM W. DOOLITTLE.

Witnesses:
PAUL SYNNESTVEDT,
PAUL CARPENTER.